INVENTORS
JAMES W. FELT
WILLIAM H. KIRN II
BY
ATTORNEY

United States Patent Office 3,525,038
Patented Aug. 18, 1970

3,525,038
HIGH SPEED CIRCUIT DISCONTINUITY DETECTOR INCLUDING TUNNEL DIODE AND SILICON CONTROLLED RECTIFIER MEANS
James W. Felt, Cedar Rapids, and William H. Kirn II, Palo Alto, Calif., assignors to Collins Radio Company, Cedar Rapids, Iowa, a corporation of Iowa
Filed Feb. 16, 1968, Ser. No. 705,971
Int. Cl. G01r 31/02
U.S. Cl. 324—51                                    11 Claims

ABSTRACT OF THE DISCLOSURE

A high speed short interval circuit discontinuity sensor dependent on current steering as controlled by impedance changes in a parallel impedance path resulting in threshold of a tunnel diode being exceeded with switching from a low voltage state to a high voltage state through an unstable negative resistance region. The increased voltage across the tunnel diode in the high voltage state results in a trigger gate current flow to a silicon controlled rectifier and closing of a light and battery circuit for visual indication that a discontinuity existed in circuitry being tested.

---

Figure 1:
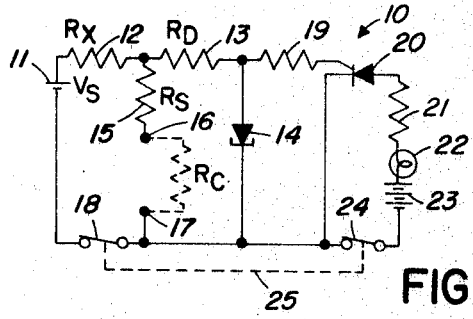

This invention relates in general to circuit interruption detectors, and in particular, to a high speed short interval disconnect sensor capable of detecting discontinuities of significance in voltage, current or impedance in duration down to as short as approximately one nanosecond.

Present day technology in high speed electronic circuits is more and more giving rise to the requirement for high speed short interval disconnect or discontinuity sensing equipment capable of detecting a very fast change in resistance through circuit connectors undergoing vibration or shock. Test equipment generally available heretofore in industry has, for example, detection capability limited to detecting at best a ten millisecond disconnect, a capability totally unacceptable standardwise for use with present day high speed computer circuits. A ten millisecond disconnect in a present day computer could result in a loss of approximately one thousand bits of information or more. It simply does not appear that there is any presently available commercial equipment capable of detecting a 200 ohm, or higher, resistance change through a connection with a duration as short as, for example, one to five nanoseconds. Such capabilities are presently required, particularly in the connector industry, in order that guarantees may be made that connectors will not open for longer intervals than an extremely short predetermined nanosecond interval approximately one to five nanoseconds long when the connecting equipment and circuitry guaranteed is undergoing prescribed standard shock or vibration tests. Such capabilities are required in order to establish industry standards in qualifying connectors for meeting the requirements beginning to be imposed by the electronic circuitry industry and particularly for the future.

It is, therefore, a principal object of this invention to provide a self-contained high speed, short interval or discontinuity sensor with the capability for detecting discontinuities in voltage, current or impedance occurring in intervals down to as short as one nanosecond duration.

A further object with such a short interval disconnect sensor is for impedance discontinuity or variation sensing capabilities to be from as low as a 200 ohm impedance change or higher through a circuit and still with the impedance discontinuity intervals being down to approximately the one nanosecond range.

Features of the invention useful in accomplishing the above objects include, in a high speed short interval circuit discontinuity sensor, operation dependent on current steering as controlled by changes in a parallel impedance path. This provides for impedance change control reaching a predetermined threshold at which time a tunnel diode is switched to a high voltage state. The increased voltage across the tunnel diode when in the high voltage state results in a trigger gate current flow to a silicon controlled rectifier that when triggered closes a light and battery circuit giving visual indication that a discontinuity exists in a circuit or connection being tested. It is a high speed short interval disconnect sensor wherein speed and impedance sensitivity characteristics may be adjusted by changing the value of various components.

Specific embodiments representing what are presently regarded as the best modes of carrying out the invention are illustrated in the accompanying drawing.

Figure 2:
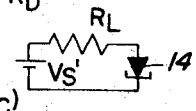
Figure 3:
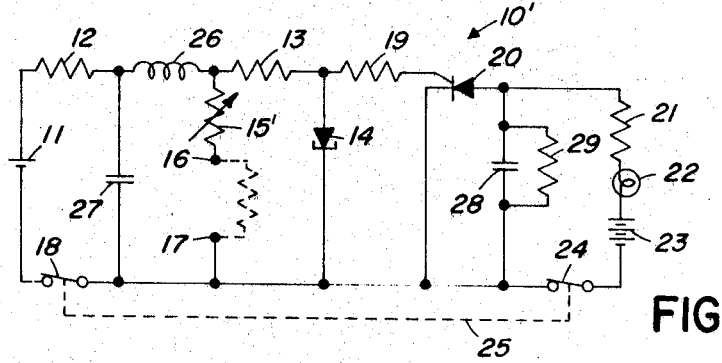
Figure 4:
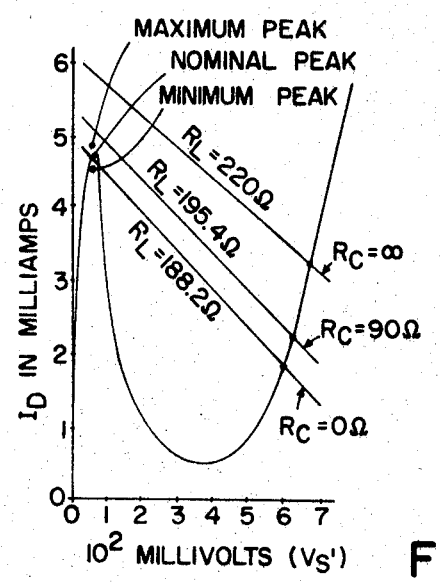
Figure 5:
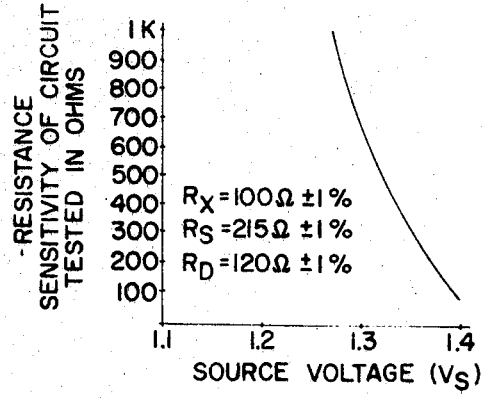

In the drawing:

FIG. 1 represents a schematic of applicants' high speed short interval circuit discontinuity;

FIG. 2, an equivalent load and source voltage circuit for the diode of the circuit of FIG. 1;

FIG. 3, a schematic of another high speed short interval circuit discontinuity sensor similar in many respects to the embodiment of FIG. 1 but with a few component additions and changes as may be desired for some variance in operation;

FIG. 4, a current versus voltage graph of the tunnel diode static characteristic curve, and with circuit equivalent load slopes also shown for several values of resistance between the test terminals or coax conductors of the embodiment of FIG. 1; and FIG. 5, a graph of test circuit or connection resistive sensitivity versus source voltage for a discontinuity sensor as shown in the embodiment of FIG. 1 with various resistors having preset values as indicated on the graph.

Referring to the drawing:

In the high speed short interval discontinuity sensor 10 of FIG. 1 a battery 11, as a voltage source, has its positive terminal connected serially through resistors 12 and 13 to the anode of tunnel diode 14. The common junction of resistors 12 and 13 is connected to and through resistor 15 to test terminal 16 associated with and spaced from another test terminal 17. These may actually be the two conductors of a coax line connection for circuits or connectors to be tested and as indicated by a dotted phantom line interconnecting the two terminals 16 and 17, and if they are coaxial terminal 16 would generally be the center conductor and terminal 17 the shield. The cathode of tunnel diode 14 and the test terminal 17 are connected in common through normally closed switch 18 to the negative terminal connection of battery 11. The common junction of resistor 13 and the anode of tunnel diode 14 is connected through resistor 19 to a current flow gating control electrode of silicon controlled rectifier 20 having a through current electrode circuit connected in common to the cathode of tunnel diode 14 with the test terminal 17 and through switch 18 to the negative side of battery 11. The anode of the silicon controlled rectifier is connected serially through resistor 21 and lamp filament 22 to the positive terminal of battery 23, on through the battery and from the negative terminal thereof to and through normally closed switch 24 to the through current electrode of the silicon controlled rectifier, and also to the cathode of tunnel diode 14. Please note that while normally closed switches 18 and 24 may be individually manually operated they are generally provided, as indicated, with a linking drive 25 that may be manually controlled for common actuation opening of the normally closed switches 18 and 24.

Referring also to the equivalent load and source voltage circuit for diode 14 of FIG. 2 and with letters having identifying subscripts being utilized for various components in FIGS. 1 and 2 supplemental to identifying numbers for convenience with the illustrated formulas. It follows, that the equivalent load $R_L$ for the tunnel diode 14 circuit is as follows:

$$R_L = \frac{R_x(R_s+R_c)}{R_x+R_s+R_c} + R_D$$

and it follows that the equivalent effective voltage $$V_s' = \frac{V_s(R_s+R_c)}{R_x+R_s+R_c}$$

The formula set forth immediately hereinbefore and the equivalent load and source voltage circuit of FIG. 2 are generally equally applicable with respect to the embodiment of FIG. 3 as well as with respect to FIG. 1. In the embodiment of FIG. 3 an inductive coil 26 is added to the circuit between the resistor 12 and the common junction of resistors 13 and 15′ with resistor 15′ having the prime since in this embodiment it is an adjustable potentiometer resistor in place of the fixed selected resistor 15 in the FIG. 1 embodiment. Capacitor 27 is added to the circuit connected between the common junction of resistor 12 and inductive coil 26 and the side of the circuit interconnecting terminal 17 and switch 18. Furthermore, added capacitor 28 and added resistor 29 are connected in parallel between the junction of the anode of the silicon controlled rectifier 20 and resistor 21 and switch 24, and through the switch 24 to the negative terminal of battery 23. The addition of the inductive coil 26 helps in speeding up action of the circuit. The addition of capacitor 27, capacitor 18 and resistor 29 make the circuit more stable when the operator throws the switches 18 and 24 open for reset and then closes them again with the sensor circuit then in the reset state. The replacement of fixed resistor 15 with the adjustable potentiometer 15′ provides more flexibility in adjustment of the circuit to different measuring sensitivity thresholds.

With both of the embodiments of FIGS. 1 and 3 operation depends on a current steering action with changes in parallel impedance paths—that is, with increases in impedance over a predetermined threshold and over a predetermined short interval time duration in the circuit connected between the terminals 16 and 17 or a complete break in the circuit connection there between that would be represented by substantially an infinite resistance increase. As soon as the impedance in the circuit or through the connection being checked reaches a predetermined threshold while the circuit, or connection, is undergoing shock or vibration testing the tunnel diode 14 is switched through an unstable negative resistance region to a relatively stable sustained high voltage state such as illustrated by the current versus voltage graph of FIG. 4. This presence of an increased voltage across the tunnel diode when in the high voltage state results in a triggering gate current flow to the silicon controlled rectifier that, when so triggered, closes a light and battery circuit giving visual indication that discontinuity exists or did exist for a short time interval in the circuit or connection being tested. It may be well to note at this point that the silicon controlled rectifier itself does not need to be very fast acting in switch actuated responsive action. This is so since the fast acting element of the circuit tunnel diode 14 after having been switched to high voltage state remains so switched until manual reset switch opening and closing of the circuit reset switches 18 and 24 is undertaken.

In an operational high speed short interval discontinuity sensor 10, such as shown in FIG. 1, with a tunnel diode 14 having the operational characteristics set forth in the graph of FIG. 4 operational results such as detecting discontinuities in voltage, current or impedance in duration down to as short as approximately one nanosecond were attained. This extremely short interval detection is being accomplished with impedance variations as low as a 200 ohm impedance change with the circuit utilizing voltages, components and values as follows:

Battery 11—1.4 volts
Resistor 12—100 ohms±1%
Resistor 13—120 ohms±1%
Tunnel diode 14—1N3717
Resistor 15—215 ohms±1%
Resistor 19—10K ohms
Silicon controlled rectifier 20—BA 1026 with 1 microamp nominal current gating control threshold and 5 microamps maximum
Resistor 21—100 ohms±10%
Battery 23—9 volts With reference at this point to the embodiment of FIG. 3, the changed component and added components are as follows in providing another working embodiment of applicants' invention:

Variable resistance potentiometer 15′—0 to 500 ohm range
Inductive coil 26—500 microhenry
Capacitors 27 and 28—100 microfarads
Resistor 29—10K ohms With the components and values as set forth with respect to the embodiment of FIG. 1 used also in the embodiment of FIG. 3, with the potentiometer 15′ adjusted to substantially the same value as fixed resistor 15, and with tunnel diode 14 characteristics as set forth in FIG. 4 it should be noted that when resistance of the connector or circuit being tested is substantially zero ($R_C=0$) the initial load line $R_L$ as worked out in accord with the formula associated with FIG. 1 and as set forth hereinbefore intersects both portions of positive resistance in the tunnel diode 14 characteristic curve. Please note that the negative resistance region of the tunnel diode characteristic curve is unstable. The initial operating point is relatively a quite low voltage state that is much too low to result in such current flow to the gating electrode of the silicon controlled rectifier for the rectifier to be gated to conduction. If the circuit or connector resistance being checked were to reach 90 ohms or higher for one nanosecond as represented by the additional load lines plotted on the graph of FIG. 4 the new load line would only intersect the high voltage positive resistance region of the characteristic curve. If after approximately one nanosecond the resistance of the connector were to go back to zero the tunnel diode would still operate in the higher voltage region resulting in the activation of the silicon controlled rectifier to the circuit activated state with the light being turned on. In the embodiment of FIG. 3 please note further that the 500 microhenry inductor provides an overdrive feature increasing the high frequency sensitivity of the circuit. Further, the sensor circuit must be manually reset after each cycle of detecting of discontinuity. In order that this may be accomplished two switches 18 and 24 must be provided that, as indicated in both embodiments, may be interconnected by a common actuating drive 25, and with these switches turning off respectively, the tunnel diode subcircuit and the silicon controlled rectifier subcircuit. Please note that thin film resistors utilized in thin film circuitry with a tunnel diode on a single substrate would increase speed capability to the point that the tunnel diode itself would be the major speed response limiting factor. There is a basic reason for the superior response time in transforming from a microsecond range to a nanosecond range, a quantum improvement in the order of approximately 100 or more, obtained with applicants' sensors as compared to other sensors using ordinary diodes as opposed to a tunnel diode. An important reason is that the frequency response of an ordinary diode is inherently lower because of its much higher junction capacity and slower switching time than is the case generally with tunnel diodes. As a result, any circuit utilizing an ordinary dode for sensing simply will not have the response time of a circuit using only a tunnel diode for sensing. Further, the tunnel diode is basically faster than ordinary type diodes simply because of differences in the semiconductor physics as applied to such devices.

Referring now to the graph of resistance sensitivity of the circuit in ohms versus source voltage ($V_s$) of FIG. 5 for the circuit discontinuity sensor it is of interest to note that if the battery voltage $V_s$ is permitted to drop much below 1.2 volts the sensor circuit will not work reliably particularly with the component values indicated on FIG. 5 of $R_x=100$ ohms$\pm 1\%$, $R_s=215$ ohms$\pm 1\%$, and $R_d=120$ ohms$\pm 1\%$, and with other component values in the embodiments of either FIG. 1 or FIG. 3 substantially as indicated. With the embodiments shown and the values set forth therefor it has been found that battery voltage ($V_s$) should be kept in the range of 1.3 volts to 1.4 volts for best performance and further, if highly uniform test results be desired that the voltage $V_s$ be continually kept at substantially 1.4 volts. The sensor circuits, particularly that of FIG. 3, have been designed and may be adjusted to detect a minimum of possibly 90 ohms impedance change through a circuit or connection connected between the test terminals 16 and 17 and undergoing shock or vibration testing with an impedance change from 1 milliohm to approximately 90 ohms being detectable in duration down to approximately 1 nanosecond. The A.C., or very fast rise time response of the particular configuration of FIG. 3, was shown to be around ½ nanosecond as seen on a sampling scope with the duration of a pulse approximately one nanosecond. This fast rise time response is due largely, sensitivity wise, to the driving feature of the 500 microhenry inductor coil 26. In these embodiments as $R_c$ goes from zero to approximately 90 ohms impedance the voltage across the tunnel diode goes from approximately 60 millivolts to 610 millivolts and then stays in the high voltage region of the tunnel diode characteristic curve until the switches 18 and 24 are opened for resetting the sensor circuit. Such a change in voltage level across the tunnel diode 14 results in triggering current flow to the silicon controlled rectifier which is thereby turned-on activated for closing a light circuit with the light visually indicating a change or discontinuity of resistance through the connector or circuit connected between terminals 16 and 17. While the tunnel diode 14 will change state in approximately one nanosecond the sensor circuit generally will not respond to a connector or circuit discontinuity reaching 90 ohms and returning back to 50 ohms or so in a discontinuity interval of time less than one microsecond long. Here again it is well to remember that the silicon controlled rectifier does not have to switch very fast since the tunnel diode stays in its high voltage state after having been switched thereto until the switches 18 and 24 are subsequently opened and closed for sensor circuit reset again.

Whereas this invention is here illustrated and described with respect to specific embodiments thereof, it should be realized that various changes may be made without departing from the essential contributions to the art made by the teachings hereof.

We claim:
1. A high speed short interval discontinuity sensor for detecting short duration discontinuities in impedance in circuitry being subject to test, including: a tunnel diode having a first terminal and a second terminal and with operational characteristics of a positive resistance low voltage state and a positive resistance high voltage state and with the positive low and high voltage states separated by an unstable negative resistance region with respect to a voltage potential imparted across the two terminals; a voltage source having a first terminal and second terminal; the first terminal of said voltage source being connected serially through first impedance means including a first resistor and second impedance means including a second resistor to the first terminal of said tunnel diode, and with the second terminal of said tunnel diode being connected to the second terminal of said voltage source; third impedance means including a third resistor connected between the common junction of said first and second impedance means and a terminal of two terminal connective means between which the circuitry being subject to test is connected, and with the connective means other terminal connected to the second terminal of said voltage source; a current flow gating device; an indicating circuit with visual indicative means and including said current flow gating device, and having a through circuit connection to said voltage source; and with said current flow gating device including a current flow gating control electrode connected to the common junction of said second impedance means and the first terminal of said tunnel diode as part of said through circuit connection to said voltage source.

2. The high speed short interval discontinuity sensor of claim 1, wherein said current flow gating device is a silicon controlled rectifier.

3. The high speed short interval discontinuity sensor of claim 2, with resistive means included in the connection between said current flow gating control electrode of the silicon controlled rectifier and the common junction of said second impedance means and the first terminal of said tunnel diode.

4. The high speed short interval discontinuity sensor of claim 3, wherein said first impedance means includes a first resistor and an inductive coil interconnecting said first resistor and said second impedance means; said second impedance means is said second resistor; said third impedance means is said third resistor; and said resistive means is a fourth resistor.

5. The high speed short interval discontinuity sensor of claim 4, wherein a capacitor is connected between the common junction of said first resistor and said inductive coil and the second terminal of said voltage source.

6. The high speed short interval discontinuity sensor of claim 1, wherein said first, second and third impedance means are said first, second and third resistors; the first terminal of the voltage source is a positive terminal, and the second terminal of the voltage source is a relatively negative terminal; and said tunnel diode is connected anode to said second impedance means and cathode to the negative terminal of the voltage source.

7. The high speed short interval discontinuity sensor of claim 6, wherein said third resistor is an adjustable potentiometer.

8. The high speed short interval discontinuity sensor of claim 6 wherein switch means is located in the voltage source and tunnel diode circuit to provide controlled current flow interruption from the voltage source through said tunnel diode and also provide reset of the tunnel diode to the unfired low voltage state.

9. The high speed short interval discontinuity sensor of claim 8, wherein said indicating circuit with visual indicating means includes said silicon controlled rectifier; with the through current electrode of the silicon controlled rectifier connected to a voltage supply and through the voltage supply to a lamp, and through the lamp on to the anode of the silicon controlled rectifier; and with the indicating circuit also including switch means for cutting off current flow through the indicating circuit from said voltage supply and for reset of the silicon controlled rectifier.

10. The high speed short interval discontinuity sensor of claim 9, wherein a fourth resistor is serially connected in said indicating circuit with said voltage supply and said lamp.

11. The high speed short interval discontinuity sensor of claim 10, wherein a capacitor and fifth resistor are connected in parallel between the anode and the through current electrode of the silicon controlled rectifier.

References Cited

UNITED STATES PATENTS

| | | | |
|---|---|---|---|
| 2,895,106 | 7/1959 | Taunt | 324—51 XR |
| 3,214,608 | 10/1965 | Mollinga | 307—286 XR |
| 3,215,996 | 11/1965 | Schwartz et al. | 340—256 XR |
| 3,252,058 | 5/1966 | Close | 340—256 XR |
| 3,277,364 | 10/1966 | Abrahamson | 340—256 XR |
| 3,353,067 | 11/1967 | White | 307—252 XR |
| 3,356,939 | 12/1967 | Stevenson | 324—51 |

GERARD R. STRECKER, Primary Examiner

U.S. Cl. X.R.

307—322; 340—256